United States Patent
Li et al.

(10) Patent No.: US 10,872,450 B2
(45) Date of Patent: Dec. 22, 2020

(54) METHOD AND APPARATUS FOR DISPLAYING INFORMATION BY ANIMATION

(71) Applicant: TENCENT TECHNOLOGY (SHENZHEN) COMPANY LIMITED, Shenzhen (CN)

(72) Inventors: Xungeng Li, Shenzhen (CN); Linzhou Zheng, Shenzhen (CN); Qian Jiang, Shenzhen (CN); Dan Liu, Shenzhen (CN); Muheng Duan, Shenzhen (CN); Yu Chen, Shenzhen (CN); Yanmin Yang, Shenzhen (CN); Mao Wang, Shenzhen (CN); Xiaowen Yao, Shenzhen (CN); Zongqing Wang, Shenzhen (CN); Qing Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 2130 days.

(21) Appl. No.: 13/850,179

(22) Filed: Mar. 25, 2013

(65) Prior Publication Data
US 2013/0215216 A1 Aug. 22, 2013

Related U.S. Application Data

(63) Continuation of application No. PCT/CN2011/079242, filed on Sep. 1, 2011.

(30) Foreign Application Priority Data
Sep. 26, 2010 (CN) .......................... 2010 1 0295172

(51) Int. Cl.
G06T 13/40 (2011.01)
G06F 9/451 (2018.01)
G06F 3/0483 (2013.01)

(52) U.S. Cl.
CPC .............. *G06T 13/40* (2013.01); *G06F 9/451* (2018.02); *G06F 3/0483* (2013.01)

(58) Field of Classification Search
CPC ........ G06T 13/40; G06F 9/451; G06F 3/0483
See application file for complete search history.

(56) References Cited

U.S. PATENT DOCUMENTS 8,543,922 B1 * 9/2013 Niles ...................... G11B 27/34
715/716
9,535,667 B2 * 1/2017 Bank ....................... G06F 9/451
(Continued)

FOREIGN PATENT DOCUMENTS

| CN | 101067787 A | 11/2007 |
| CN | 101079713 A | 11/2007 |
| CN | 101661376 A | 3/2010 |

OTHER PUBLICATIONS

Chinese Second Examination Report of China Application No. 201010295172.8, dated Jun. 24, 2013.
(Continued)

*Primary Examiner* — Eric J. Bycer
(74) *Attorney, Agent, or Firm* — Marshall, Gerstein & Borun LLP

(57) ABSTRACT

The present invention provides a method and an apparatus for displaying information by animation. The method includes: creating different interfaces corresponding to different visible areas; determining a visible interface among the created interfaces, displaying the visible interface, and hiding the other interfaces; and displaying, when receiving a trigger of displaying a visible area, an interface corresponding to the visible area in an animated manner, and (Continued)

hiding interfaces other than the interface corresponding to the visible area. The present invention avoids occurrence of flashing after the end of animation that is caused by coercive rearrangement of a control and adverse to the effect of animated display.

11 Claims, 3 Drawing Sheets

(56) References Cited

U.S. PATENT DOCUMENTS

| | | | |
|---|---|---|---|
| 2008/0115081 A1* | 5/2008 | Sankaravadivelu | G06F 9/451 715/783 |
| 2009/0319914 A1 | 12/2009 | Roseway et al. | 715/753 |
| 2011/0047187 A1* | 2/2011 | Sinha | G06F 9/543 707/802 |
| 2011/0113363 A1* | 5/2011 | Hunt | G06F 3/04847 715/800 |
| 2011/0296351 A1* | 12/2011 | Ewing, Jr. | G06F 3/0346 715/841 |

OTHER PUBLICATIONS

International Search Report of International Application No. PCT/CN2011/079242, dated Nov. 10, 2011.

* cited by examiner

METHOD AND APPARATUS FOR DISPLAYING INFORMATION BY ANIMATION

CROSS REFERENCE TO RELATED APPLICATIONS

This application is a continuation application of International Application No. PCT/CN2011/079242, filed on Sep. 1, 2011, and entitled "METHOD AND APPARATUS FOR DISPLAYING INFORMATION BY ANIMATION", which claims priority benefit of Chinese Patent Application No. 201010295172.8, filed on Sep. 26, 2010 and entitled "METHOD AND APPARATUS FOR DISPLAYING INFORMATION BY ANIMATION". The contents of the above identified applications are incorporated herein by reference in their entirety.

FIELD OF THE TECHNOLOGY

The present invention relates to network technology, and in particular, to a method and an apparatus for displaying information by animation.

BACKGROUND

With development of handheld terminals such as mobile phone and personal digital assistant (PDA), more and more products that run on handheld terminals, such as microblog and other applications, display information in an animated manner. The following describes a solution to displaying information in an animated manner in the prior art, taking microblog displayed on a mobile phone as an example. Persons skilled in the art understand that when other handheld terminals run other applications, the solutions to displaying information in an animated manner are similar.

Microblog, also known as micro blog, is an Internet application product based on user relationship. A user may log in to the microblog through various Internet terminals to share, propagate and acquire information. A microblog generally includes up to 140 Chinese characters. Currently, a microblog displayed in an animated manner is applied to an ANDROID system (which is a mobile phone operating system launched by GOOGLE). Specifically, if a single broadcast page in the microblog is composed of a personal information area and a function area, the function area is displayed and the personal information area is hidden at the beginning. When the personal information area needs to be displayed, the function area cascades down gradually in an animated manner until the personal information area is displayed completely; when the personal information area needs to be closed, the function area is pulled upward gradually in an animated manner until the personal information area is completely hidden.

However, the animation in the ANDROID system changes only the representation form of exterior location relationships of controls, without changing the actual layout relationship of the controls. The animation remains in the original area. For example, when the personal information area needs to be displayed, the control of the function area appears to cascade down, but actually remains where it was before the cascading, which makes the appearing location inconsistent with the actual location. To solve such a problem, the control needs to be coercively rearranged after the animation is ended or before the animation is executed. However, as a consequence of the rearrangement, flashing occurs after the end of animation, which is adverse to the effect of animated display.

SUMMARY

The present invention provides a method and an apparatus for displaying information by animation to avoid occurrence of flashing after the end of animation, which is caused by coercive rearrangement of a control and adverse to the effect of animated display.

The present invention provides the following technical solutions:

A method for displaying information by animation includes the following steps:

A. creating different interfaces corresponding to different visible areas;

B. determining a visible interface among the created interfaces, displaying the visible interface, and hiding the other interfaces; and C. displaying, when receiving a trigger of displaying a visible area, an interface corresponding to the visible area in an animated manner, and hiding interfaces other than the interface corresponding to the other created visible area.

An apparatus for displaying information by animation includes:

a creating unit, configured to create different interfaces corresponding to different visible areas;

a layout unit, configured to determine a visible interface among the created interfaces, display the visible interface, and hide the other created interfaces; and a first display unit, configured to display, when receiving a trigger of displaying a visible area, an interface corresponding to the visible area in an animated manner, and hide interfaces other than the interface corresponding to the visible area.

Further, an embodiment of the present invention provides an apparatus for displaying information by animation, including a processor and a machine-readable medium, where the machine-readable medium stores an instruction set. When the instruction set is executed, the processor can execute the method for displaying information by animation according to the present invention.

As revealed in the technical solutions described above, in the present invention, different interfaces corresponding to different visible areas are created, a visible interface is determined among the created interfaces, and the visible interface is displayed and the other interfaces are hidden; when a trigger of displaying a visible area is received, an interface corresponding to the visible area is displayed in an animated manner, and interfaces other than the interface corresponding to the visible area are hidden; evidently, compared with the prior art that keeps the interfaces unchanged and lets the area on the interface cascade down, the present invention displays a new complete interface. In this way, the present invention avoids the problem that the appearing location of a control is inconsistent with the actual location, and avoids occurrence of flashing after the end of animation, which is caused by coercive rearrangement of the control and adverse to the effect of animated display; and derives smooth animation and correct interaction areas.

DETAILED DESCRIPTION

To avoid occurrence of flashing after the end of animation, which is caused by coercive rearrangement of a control and is adverse to the effect of animated display, the method provided in the present invention may create different interfaces for different visible areas; in this way, when a trigger of displaying a visible area is received, an interface corresponding to the visible area triggered to be displayed is displayed in an animated manner, where the displayed interface, compared with the previously displayed interface, is a new and complete interface rather than an interface formed in the prior art by cascading an area; therefore, the present invention avoids the problem that the appearing location of a control is inconsistent with the actual location, and avoids occurrence of flashing after the end of animation, which is caused by coercive rearrangement of the control and is adverse to the effect of animated display.

To make the objectives, technical solutions and advantages of the present invention clearer, the following describes the present invention in detail with reference to accompanying drawings and embodiments.

Figure 1A:
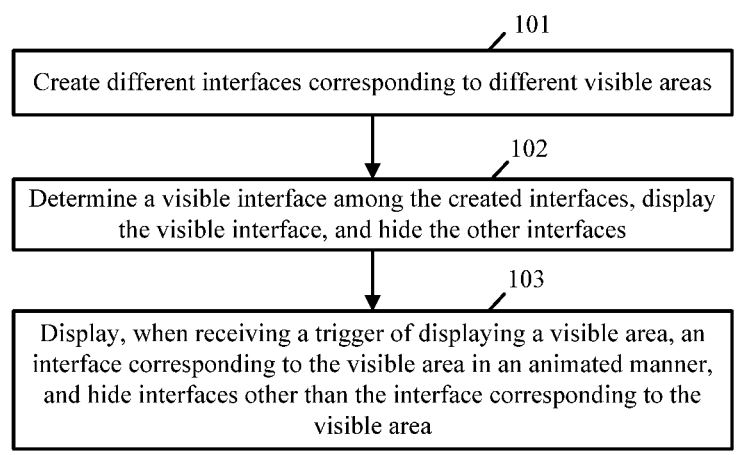
FIG. 1A is a basic flowchart of a method for displaying information by animation according to an embodiment of the present invention.
Figures 1B, 1C:
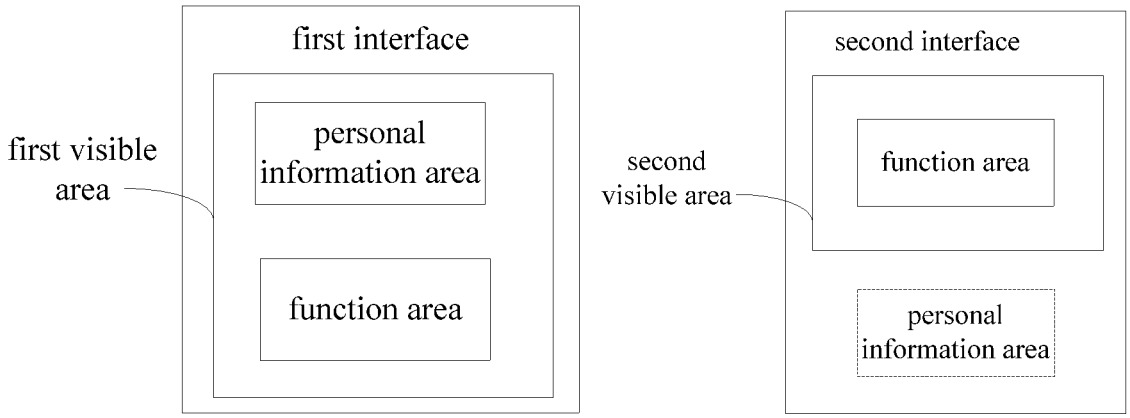
FIG. 1B is a schematic diagram illustrating a first interface with a first visible area.
FIG. 1C is a schematic diagram illustrating a second interface with a second visible area.

FIG. 1 is a basic flowchart of a method for displaying information by animation according to an embodiment of the present invention. As shown in FIG. 1, the method may include the following steps:

Step 101: Create different interfaces corresponding to different visible areas.

If different visible areas need to be rendered, the displayed interfaces differ. Therefore, in step 101, a corresponding interface is created for each visible area to display the rendering state corresponding to the visible area.

Step 102: Determine a visible interface among the created interfaces, display the visible interface, and hide the other created interfaces.

In step 102, the visible interface and the other interfaces may be laid out in a frame layout structure to fulfill the purpose of displaying the visible interface and hiding other created interfaces. Specifically, the visible interface is set on the top layer, and other interfaces are under the visible interface.

It should be noted that in step 101, if a created interface includes a visible area and an invisible area, the visible area and the invisible areas may also be laid out on the interface in a frame layout structure. The specific layout is: the visible area is set on the top layer, and the other invisible areas are under the visible area.

Step 103: Display, when receiving a trigger of displaying a visible area, an interface corresponding to the visible area in an animated manner, and hide interfaces other than the interface corresponding to the visible area.

Thus, the process provided in an embodiment of the present invention has been described above.

Specifically, in the foregoing embodiment, each interface may include at least two areas that need to be displayed by an application, at least one area in each interface makes up the visible area corresponding to the interface, and each interface corresponds to a different visible area.

For example, an application may need to display multiple areas as required, such as a first area, a second area, and a third area. Under different conditions, the display requirements differ. For example, under a first set condition, the first area, the second area or the third area needs to be visible alone, and other areas need to be invisible, and therefore, the first area, the second area or the third area is the visible area respectively; or, under a second set condition, two areas need to be visible in combination, and other areas need to be invisible, and therefore, the two combined visible areas are the visible area; or, under a third set condition, all areas need to be visible simultaneously, and therefore, a combination of all areas is the visible area.

In the embodiment, different interfaces are created for visible areas under the foregoing different conditions, respectively. When a trigger of displaying a visible area is received, for example, the first, second or third set condition is fulfilled, an interface corresponding to the visible area is displayed in an animated manner, and the interfaces other than the interface corresponding to the visible area are hidden.

Those skilled in the art understand that when the application has two, four or more areas, the way of determining the visible areas as required and the way of creating the corresponding interfaces are the same as that described above when the application has three areas.

The areas on each interface may be laid out in a frame layout structure and the visible area is set above other areas so that control is exercised to display the visible area and hide the other areas.

Similarly, the operation of displaying the visible interface and hiding the other interfaces may be: laying out interfaces in a frame layout structure and setting the visible interface above the other interfaces so that control is exercised to display the visible interface and hide the other interfaces.

When the foregoing interface layout mode is applied, the operation of creating different interfaces corresponding to different visible areas may include the following steps:

creating interfaces that include areas of applications, such as a first interface, a second interface, a third interface, and so on;

obtaining information for filling each of the areas, and filling the corresponding area of each interface with the obtained information; and setting the corresponding area in each interface as a visible area and hiding the other areas according to a mapping relationship between the interface and the visible area, and determining each interface as an interface corresponding to each visible area. For example, two areas on the first interface are set as a first visible area, and other areas are hidden, and the first interface is determined as an interface corresponding to the first visible area; one area on the second interface is set as a second visible area, and other areas are hidden, and the second interface is determined as an interface corresponding to the second visible area.

The process provided in embodiments of the present invention is applicable to mobile phone microblog and other applications. For example, a common document reader program generally includes a text area and a setting area. In the reading status, only the text area is displayed, and the setting area is hidden; when triggered by a user click, the text area and the setting area may become visible area simultaneously. Besides, navigation programs, photographing programs, and so on, have different display status, and, in different display statuses, have different visible area. Therefore, the technical solutions of the present invention are applicable to all such applications. The following describes the foregoing process, taking a mobile phone microblog that includes two areas as an example. For other applications, the process is based on the same principles, and is not detailed here any further.

Figure 2:
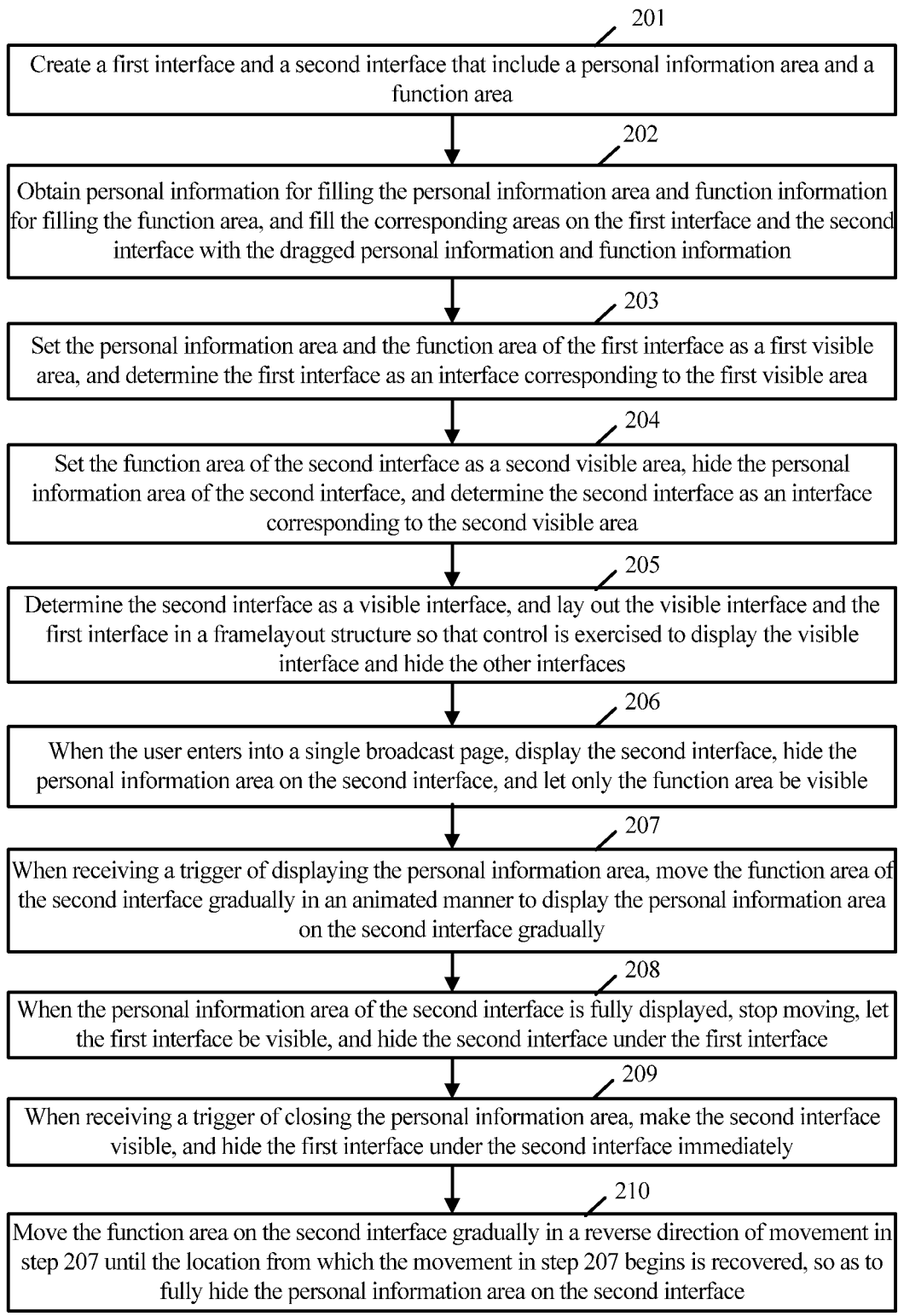
FIG. 2 is a detailed flowchart of a method for displaying information by animation according to an embodiment of the present invention.

FIG. 2 is a detailed flowchart of a method for displaying information by animation according to an embodiment of the present invention. The embodiment is applied to a mobile phone microblog. In the mobile phone microblog, a single broadcast page mainly includes two areas. One area is a personal information area, including personal information such as number of objects listened to, audience quantity, number of all published broadcasts, and so on; the other area is a function area, including function information such as broadcast content, buttons operable for the broadcast, and so on. Besides, a single broadcast page may be generally displayed in two statuses. In one status (a first status), both the personal information area and the function area are visible; in the other status (a second status), only the function area is visible, and the personal information area is hidden. Therefore, the process shown in FIG. 2 may include the following steps:

Step 201: Create a first interface and a second interface that include a personal information area and a function area.

Step 202: Obtain personal information for filling the personal information area and function information for filling the function area. Specifically, drag such information from a server, and then fill the corresponding areas on the first interface and the second interface with the dragged personal information and function information.

That is, the personal information is respectively filled into the personal information area of the first interface and the second interface, and the function information is respectively filled into the function area of the first interface and the second interface.

Step 203: Set the personal information area and the function area of the first interface as a first visible area, and determine the first interface as an interface corresponding to the first visible area.

That is, step 203 is the first status of the single broadcast page.

The location relationship between the function area and the personal information area of the first interface is related to the movement direction in step 207, and will be detailed in step 208.

Step 204: Set the function area of the second interface as a second visible area, hide the personal information area of the second interface, and determine the second interface as an interface corresponding to the second visible area.

That is, step 204 is the second status of the single broadcast page.

The operation of setting the function area of the second interface as a second visible area and hiding the personal information area of the second interface in step 204 may be implemented by laying out the personal information area and the function area of the second interface in a frame layout structure so that control is exercised to display the function area of the second interface and hide the personal information area of the second interface, that is, to put the function area on the top layer and hide the personal information area below the function area, which may be specifically implemented by setting depth of Zorder.

Step 205: Determine the second interface as a visible interface, and lay out the visible interface and the first interface in a frame layout structure so that control is exercised to display the visible interface and hide the other interface.

That is to say, through step 205, the second interface is on the top layer and is displayed, but the first interface is hidden under the second interface, which may be specifically implemented by setting depth of Zorder.

Steps 201 to 205 above may be operations performed before the user enters a single broadcast page, and then step 206 is performed when the user enters into a single broadcast page.

Step 206: When the user enters a single broadcast page, display the second interface, hide the personal information area on the second interface, and let only the function area be visible.

It can be seen that, when the user enters into a single broadcast page for the first time, the status of the single broadcast page is the second status, that is, the second interface is displayed, and the personal information area on the second interface is hidden and only the function area is visible.

It should be noted that, in the embodiment, if other additional interfaces such as a third interface in addition to the first interface and the second interface are created in step 201, when the user enters into a single broadcast page, the other additional interfaces such as the third interface may be displayed in addition to the second interface.

Step 207: When receiving a trigger of displaying the personal information area, move the function area of the second interface gradually in an animated manner to display the personal information area on the second interface gradually.

The moving in the embodiment may be implemented in different ways, such as cascading, translating, and so on.

If the moving is cascading, for example, the moving in step 207 may be: cascading the function area of the second interface gradually in an animated manner.

Step 208: When the personal information area of the second interface is fully displayed, stop moving, let the first interface be visible, and hide the second interface under the first interface.

After the personal information area is set in step 201, the size of the personal information area is determinable. When the moving distance of the function area is equal to the size of the personal information area, it indicates that the personal information area of the second interface is fully displayed.

If it is set in the embodiment that the function area of the second interface cascades down in an animated manner, the size of the personal information area is the height of the personal information area; if it is set in the embodiment that the function area of the second interface translates in an animated manner, the size of the personal information area is the width of the personal information area. If the function area of the second interface cascades down, for example, step 208 is: when the cascading height of the function area is equal to the height of the personal information area, it indicates that the personal information area of the second interface is fully displayed; at this time, stop animated cascading, let the first interface be visible, and hide the second interface under the first interface.

It can be seen that, the first interface is actually the status after completion of the movement animation, and the location relationship between the function area and the personal information area on the first interface is related to the movement direction. If the movement is cascade, the function area of the first interface is located under the personal information area; if the movement is translation, such as the function area translating to the left, the function area of the first interface is located left to the personal information area.

It should be noted that if other interfaces such as a third interface are displayed in addition to the second interface in step 206, when the third interface does not need to be displayed, the third interface may be moved gradually in an animated manner, for example, cascaded or translated in an animated manner until the third interface moves out. Nevertheless, if the third interface needs to be displayed, the third interface may still be displayed. Whether to display the third interface depends on specific situation and is not limited here.

Step 209: When receiving a trigger of closing the personal information area, make the second interface visible, and hide the first interface under the second interface immediately.

Step 210: Move the function area on the second interface gradually in a reverse direction of movement in step 207 until the location from which the movement in step 207 begins is recovered, so as to fully hide the personal information area on the second interface.

Actually, step 210 is to recover the initial status of a single broadcast page, that is, the second status of a single broadcast page. Because the function area of the second interface has been moved in step 208, to recover the initial status of the second interface, the function area on the second interface needs to be moved in a reverse direction until the location from which the movement in step 207 begins is recovered.

Assuming that the function area of the second interface is cascaded down in step 207, step 210 is: pull upward the function area on the second interface until the location from which the cascading in step 207 begins is recovered. That is, when step 210 is completed, the status existent when the user just enters a single broadcast page is recovered.

Based on explanation on the foregoing instance, an interface may be displayed in an animated manner in many ways. A preferred way of displaying the interface is as follows:

Step 103, which displays, when receiving a trigger of displaying a visible area, an interface corresponding to the visible area in an animated manner and hides interfaces other than the interface corresponding to the visible area, may include the following operations:

moving, when receiving a trigger of displaying a visible area, in the current interface, the visible area on the current interface gradually in an animated manner to display the visible area on the interface to be displayed as triggered; and stopping moving, when the visible area on the interface to be displayed is fully displayed, the area in an animated manner, displaying the interface to be displayed, and hiding other interfaces.

The foregoing scenario is similar to the scenario of switching from displaying the second interface to displaying the first interface so as to display the personal information area and the function area in the preceding embodiment. The animation mode of moving the area in an animated manner first and then displaying the interface is especially applicable to the scenario of increasing displayed areas.

Alternatively, step 103, which displays, when receiving a trigger of displaying a visible area, an interface corresponding to the visible area in an animated manner and hides interfaces other than the interface corresponding to the visible area, may include the following operations:

switching to displaying, when receiving a trigger of displaying a visible area, the interface to be displayed as triggered, hiding other interfaces, and, in an animated manner, gradually moving the visible area on the interface to be displayed, until other areas on the interface to be displayed are overlaid.

The foregoing scenario is similar to the scenario of switching from displaying the first interface to displaying the second interface so as to display the function area in the preceding embodiment. The animation mode of displaying the interface first and then moving the area in an animated manner is especially applicable to the scenario of decreasing displayed areas.

Overall, step 103, which displays, when receiving a trigger of displaying a visible area, an interface corresponding to the visible area in an animated manner and hides interfaces other than the interface corresponding to the visible area, preferably includes the following operations:

switching, when receiving a trigger of displaying a visible area, between the current interface and the interface to be displayed as triggered, and, in the switching process, moving in an animated manner the area on the current interface and/or the area on the interface to be displayed as triggered.

That is, in the process of switching interfaces, to implement the animated effect, the area on the current interface or on the interface to be displayed may be moved separately in an animated manner, or, the areas on the current interface and on the interface to be displayed may be moved simultaneously in an animated manner. The animated movement may be completed before or after the interface is switched so as to achieve a display effect of gradual change.

So far, the method provided in an embodiment of the present invention has been described completely.

The following describes an apparatus provided in an embodiment of the present invention.

Figure 3:
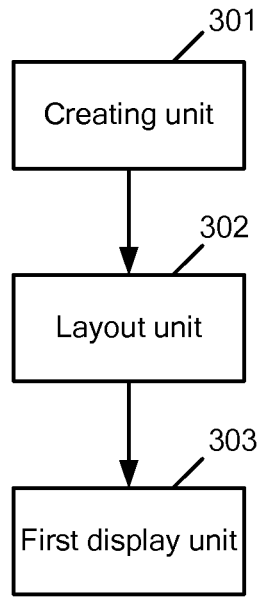
FIG. 3 is a basic structural diagram of an apparatus for displaying information by animation according to an embodiment of the present invention.

FIG. 3 is a basic structural diagram of an apparatus for displaying information by animation according to an embodiment of the present invention. As shown in FIG. 3, the apparatus may include a creating unit 301, a layout unit 302, and a first display unit 303.

The creating unit 301 is configured to create different interfaces corresponding to different visible areas;

The layout unit 302 is configured to determine a visible interface among the created interfaces, display the visible interface, and hide the other created interfaces; and The first display unit 303 is configured to display, when receiving a trigger of displaying a visible area, an interface corresponding to the visible area in an animated manner, and hide interfaces other than the interface corresponding to the visible area.

Outlined above is an apparatus according to an embodiment of the present invention. The following describes the apparatus according to the embodiment of the present invention in more detail.

Figure 4:
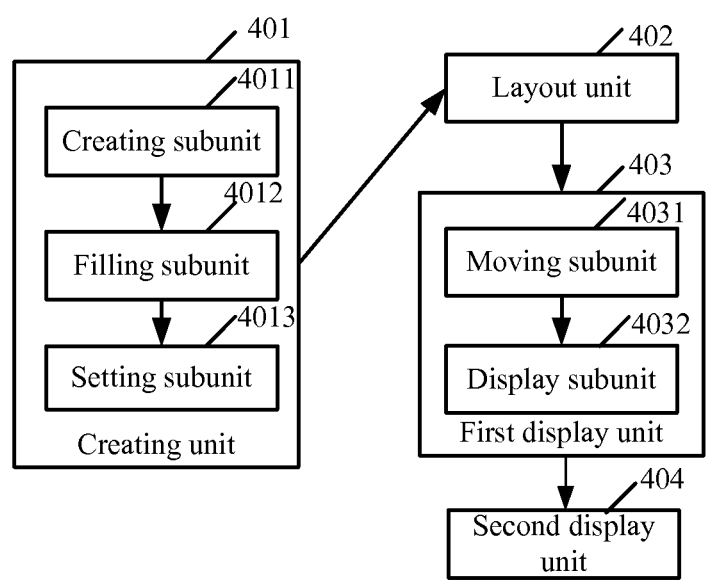
FIG. 4 is a detailed structural diagram of an apparatus for displaying information by animation according to an embodiment of the present invention.

FIG. 4 is a detailed structural diagram of an apparatus for displaying information by animation according to an embodiment of the present invention. As shown in FIG. 4, the apparatus may include a creating unit 401, a layout unit 402, and a first display unit 403. The creating unit 401, the layout unit 402, and the first display unit 403 have functions similar to the functions of the creating unit 301, the layout unit 302, and the first display unit 303 respectively, and are not detailed here any further.

Preferably, as shown in FIG. 4, the creating unit 401 may include:

a creating subunit 4011, configured to create a first interface and a second interface that include a personal information area and a function area;

a filling subunit 4012, configured to obtain personal information for filling the personal information area and function information for filling the function area, for example, preferably, drag such information from a server, and then fill the corresponding areas on the first interface and the second interface with the dragged personal information and function information; and a setting subunit 4013, configured to set the personal information area and the function area on the first interface as a first visible area, and determine the first interface as an interface corresponding to the first visible area; and, set the function area on the second interface as a second visible area, and hide the personal information area on the second interface, and determine the second interface as an interface corresponding to the second visible area.

In the embodiment, the layout unit 402 may lay out the visible interface and the other interfaces in a frame layout structure so that control is exercised to display the visible interface and hide the other interfaces; and The setting subunit 4013 may lay out the visible area and the personal information area of the second interface in a frame layout structure so that control is exercised to display the function area of the second interface and hide the personal information area of the second interface.

In the embodiment, the visible interface determined by the layout unit 402 is the second interface. Therefore, as shown in FIG. 4, the first display unit 403 may include:

a moving subunit 4031, configured to: when receiving a trigger of displaying the personal information area, move the function area of the second interface gradually in an animated manner to display the personal information area on the second interface gradually; and a display subunit 4032, configured to: when the personal information area of the second interface is fully displayed, stop moving, let the first interface be visible, and further hide the second interface.

Preferably, as shown in FIG. 4, the apparatus further includes a second display unit 404.

The second display unit 404 is configured to make the second interface visible and hide the first interface when receiving a trigger of closing the personal information area; and then move the function area on the second interface gradually in a reverse direction of movement of the moving subunit until the location from which the movement of the moving subunit begins is recovered.

Detailed above is an apparatus according to an embodiment of the present invention.

Preferably, on the basis of the apparatus for displaying information by animation according to the embodiment above, each interface includes at least two areas that need to be displayed by an application, at least one area in each interface makes up a visible area corresponding to the interface, and each interface corresponds to a different visible area.

The areas in each interface may be laid out in a frame layout structure and the visible area is set above the other areas so that control is exercised to display the visible area and hide other areas.

The creating unit may specifically include:

an interface creating subunit, configured to create interfaces that include areas of the application;

an information filling subunit, configured to obtain information for filling each area, and fill the corresponding area of each interface with the obtained information; and an interface determining subunit, configured to set the corresponding area in each interface as a visible area and hide the other areas according to a mapping relationship between the interface and the visible area, and determine each interface as an interface corresponding to each visible area.

The layout unit may be specifically configured to lay out each interface in a frame layout structure and set the visible area above the other areas so that control is exercised to display the visible area and hide other areas.

The first display unit may be specifically configured to: when receiving a trigger of displaying a visible area, switch between the current interface and the interface to be displayed as triggered, and, in the switching process, move in an animated manner the area on the current interface and/or the area on the interface to be displayed as triggered.

Preferably, the first display unit may include:

an animated display subunit, configured to: when receiving a trigger of displaying a visible area, in the current interface, move a visible area on the current interface gradually in an animated manner to display the visible area on the interface to be displayed as triggered; and a first interface display subunit, configured to: when the visible area on the interface to be displayed is fully displayed, stop moving the area in an animated manner, display the interface to be displayed, and hide the other interfaces.

Alternatively, the first display unit may include:

a second interface display subunit, configured to: when receiving a trigger of displaying a visible area, switch to displaying the interface to be displayed as triggered, hide the other interfaces, and, in an animated manner, gradually move the visible area on the interface to be displayed, until the other areas on the interface to be displayed are overlaid.

Further, an embodiment of the present invention provides an apparatus for displaying information by animation, including a processor and a machine-readable medium, where the machine-readable medium stores an instruction set. When the instruction set is executed, the processor can execute the method for displaying information by animation according to any embodiment of the present invention.

The method provided in the present invention may be stored as a computer program in a machine-readable medium such as an optical disk. The processor is configured to execute the instructions stored in the machine-readable medium, and is configured to execute various embodiments of the foregoing method for displaying information by animation.

As revealed in the technical solutions described above, in the present invention, different interfaces corresponding to different visible areas are created, a visible interface is determined among the created interfaces, and the visible interface is displayed and the other created interfaces are hidden; when a trigger of displaying a visible area is received, an interface corresponding to the visible area is displayed in an animated manner; it can be seen that, compared with the prior art that the interface remains unchanged and only the area on the interface cascades down, the present invention displays a new complete interface. In this way, the present invention avoids the problem that the appearing location of a control is inconsistent with the actual location, and thus avoids occurrence of flashing after the end of animation, which is caused by coercive rearrangement of the control and adverse to the effect of animated display; and derives smooth animation and correct interaction areas.

The foregoing descriptions are merely exemplary embodiments of the present invention, but are not intended to limit the present invention. Any modifications, equivalent substitutions, and improvements made within the spirit and principles of the present invention shall fall within the protection scope of the present invention.

What is claimed is:

1. A method for displaying information by animation, comprising:
creating different interfaces corresponding to different visible areas;
determining a visible interface among the created interfaces, displaying the visible interface, and hiding the other created interfaces; and
displaying, when receiving a trigger of displaying a visible area, an interface corresponding to the visible area, and hiding interfaces other than the interface corresponding to the visible area, which comprises: moving, when receiving a trigger of displaying the visible area, in the current interface, the visible area on the current interface to display the visible area on the interface to be displayed as triggered; and when the visible area on the interface to be displayed is fully displayed, stopping moving the visible area on the current interface, displaying the interface to be displayed, and hiding the other interfaces; wherein,
the different interfaces are created by following steps:
creating a first interface that comprises a personal information area and a function area of an application and creating a second interface that comprises a personal information area and a function area of the application;
dragging, from a server, personal information for filling the personal information area of the first interface and the personal information area of the second interface; and function information for filling the function area of the first interface and the function area of the second interface; filling the personal information area of the first interface and the personal information area of the second interface with the dragged personal information, and filling the function area of the first interface and the function area of the second interface with the dragged function information; and
setting the personal information area and the function area of the first interface as a first visible area, and determining the first interface as an interface corresponding to the first visible area; and setting the function area of the second interface as a second visible area, hiding the personal information area of the second interface, and determining the second interface as an interface corresponding to the second visible area.

2. The method according to claim 1, wherein:
each interface comprises at least two areas that need to be displayed by the application, at least one area in each interface makes up a visible area corresponding to the interface, and each interface corresponds to a different visible area.

3. The method according to claim 2, wherein:
areas in each interface are laid out in a frame layout structure and the visible area is set above other areas so that control is exercised to display the visible area and hide the other areas.

4. The method according to claim 1, wherein: the displaying the visible interface and the hiding the other interfaces comprise:
laying out each interface in a frame layout structure and setting the visible area above the other areas so that control is exercised to display the visible area and hide the other areas.

5. An apparatus for displaying information by animation, comprising a processor and a machine-readable medium, wherein the machine-readable medium stores an instruction set; when the instruction set is executed, the processor is configured to:
create different interfaces corresponding to different visible areas;
determine a visible interface among the created interfaces, display the visible interface, and hide the other interfaces; and
display, when receiving a trigger of displaying a visible area, an interface corresponding to the visible area, and hide interfaces other than the interface corresponding to the visible area; wherein,
the processor is further configured to:
create a first interface that comprises a personal information area and a function area of an application and create a second interface that comprises a personal information area and a function area of the application;
drag, from a server, personal information for filling the personal information area of the first interface and the personal information area of the second interface; and function information for filling the function area of the first interface and the function area of the second interface; filling the personal information area of the first interface and the personal information area of the second interface with the dragged personal information, and filling the function area of the first interface and the function area of the second interface with the dragged function information;
set the personal information area and the function area on the first interface as a first visible area, and determine the first interface as an interface corresponding to the first visible area; and, set the function area on the second interface as a second visible area, and hide the personal information area on the second interface, and determine the second interface as an interface corresponding to the second visible area;
wherein:
the processor is further configured to:
when receiving a trigger of displaying a visible area, in the current interface, move a visible area on the current interface to display the visible area on the interface to be displayed as triggered;
when the visible area on the interface to be displayed is fully displayed, stop moving the visible area on the current interface, display the interface to be displayed, and hide the other interfaces.

6. The apparatus according to claim 5, wherein:
each interface comprises at least two areas that need to be displayed by an application, at least one area in each interface makes up the visible area corresponding to the interface, and each interface corresponds to a different visible area.

7. The apparatus according to claim 6, wherein:
areas in each interface are laid out in a frame layout structure and the visible area is set above other areas so that control is exercised to display the visible area and hide the other areas.

8. The apparatus according to claim 5, wherein the processor is further configured to:
lay out each interface in a frame layout structure and set the visible area above other areas so that control is exercised to display the visible area and hide the other areas.

9. A method for displaying information by animation, comprising:
creating different interfaces corresponding to different visible areas;
determining a visible interface among the created interfaces, displaying the visible interface, and hiding the other created interfaces; and displaying, when receiving a trigger of displaying a visible area, an interface corresponding to the visible area, and hiding interfaces other than the interface corresponding to the visible area; wherein, the visible interface is a second interface, and the displaying, when receiving a trigger of displaying the visible area, an interface corresponding to the visible area, and hiding interfaces other than the interface corresponding to the visible area comprises:

when receiving a trigger of displaying the personal information area, moving the function area of the second interface to display the personal information area on the second interface;

when the personal information area of the second interface is fully displayed, stopping moving the function area of the second interface, letting a first interface be visible, and hiding the second interface the different interfaces are created by following steps:

creating a first interface that comprises a personal information area and a function area of an application and creating a second interface that comprises a personal information area and a function area of the application;

dragging, from a server, personal information for filling the personal information area of the first interface and the personal information area of the second interface; and function information for filling the function area of the first interface and the function area of the second interface; filling the personal information area of the first interface and the personal information area of the second interface with the dragged personal information, and filling the function area of the first interface and the function area of the second interface with the dragged function information; and setting the personal information area and the function area of the first interface as the first visible area, and determining the first interface as an interface corresponding to the first visible area; and setting the function area of the second interface as the second visible area, hiding the personal information area of the second interface, and determining the second interface as an interface corresponding to the second visible area.

10. The method according to claim 9, wherein after the stopping moving the function area of the second interface, letting the first interface be visible, and hiding the second interface, if a trigger of closing the personal information area is received, the method further comprises making the second interface visible, and hiding the first interface;

moving the function area on the second interface in a reverse direction of movement until the location from which the movement begins is recovered.

11. The method according to claim 9, wherein the creating different interfaces corresponding to different visible areas comprises:

creating interfaces that comprise areas of an application; and obtaining information for filling each area, and filling the corresponding area of each interface with the obtained information; and setting the corresponding area in each interface as a visible area and hiding the other areas according to a mapping relationship between the interface and the visible area, and determining each interface as an interface corresponding to each visible area.

* * * * *

UNITED STATES PATENT AND TRADEMARK OFFICE
CERTIFICATE OF CORRECTION

PATENT NO. : 10,872,450 B2
APPLICATION NO. : 13/850179
DATED : December 22, 2020
INVENTOR(S) : Xungeng Li et al.

Page 1 of 1

It is certified that error appears in the above-identified patent and that said Letters Patent is hereby corrected as shown below:

In the Claims

At Column 13, Line 17, in Claim 9, "interface" should be -- interface; --.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*